July 31, 1923.  
G. L. TALLMAN ET AL  
1,463,491  
COMBINED GOVERNOR AND COMMUTATOR SUPPORT FOR MOTOR VEHICLES  
Filed Dec. 29, 1919  
2 Sheets-Sheet 1
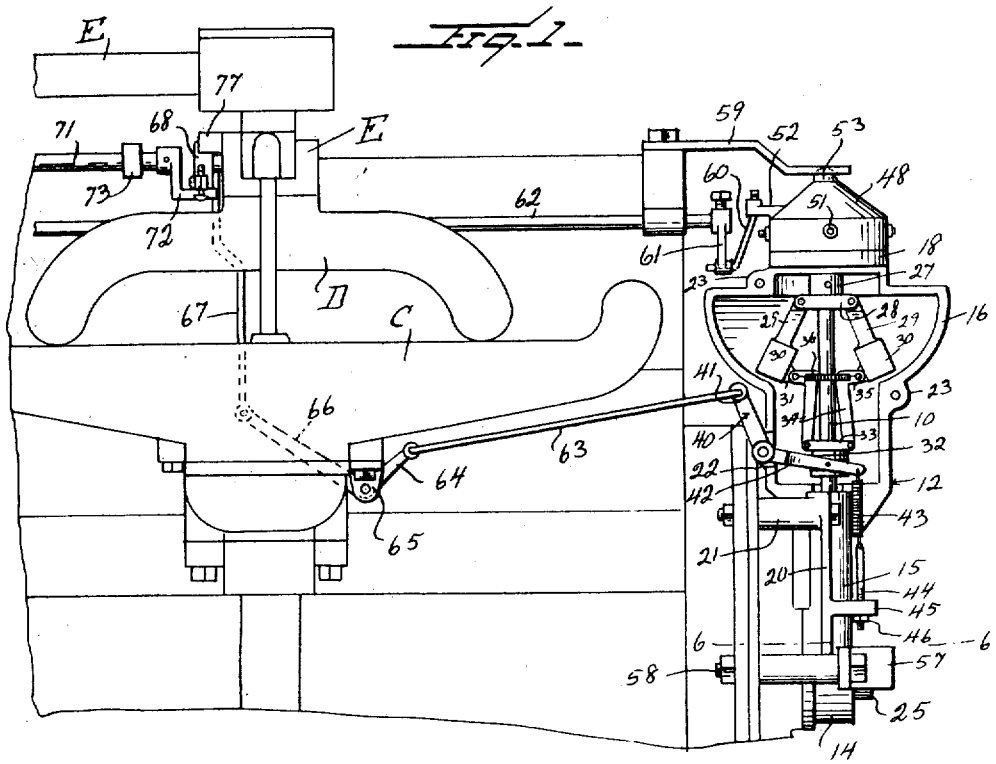
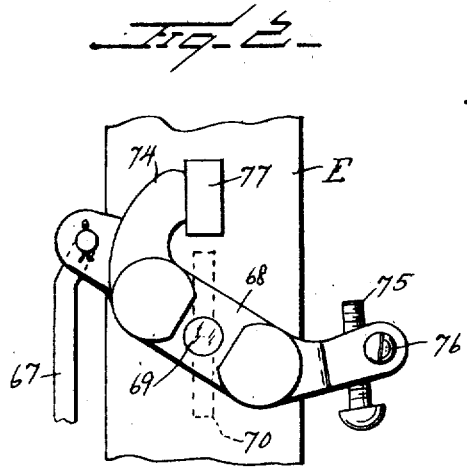
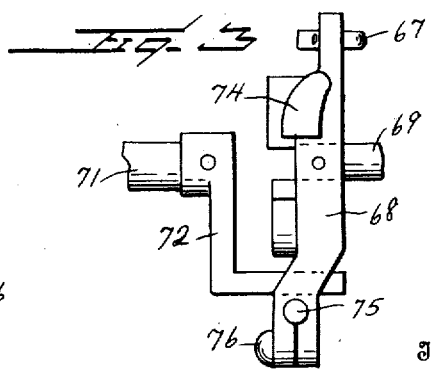
Inventors  
G. L. Tallman and  
A. A. Jones.  
By Watson E. Coleman  
Attorney

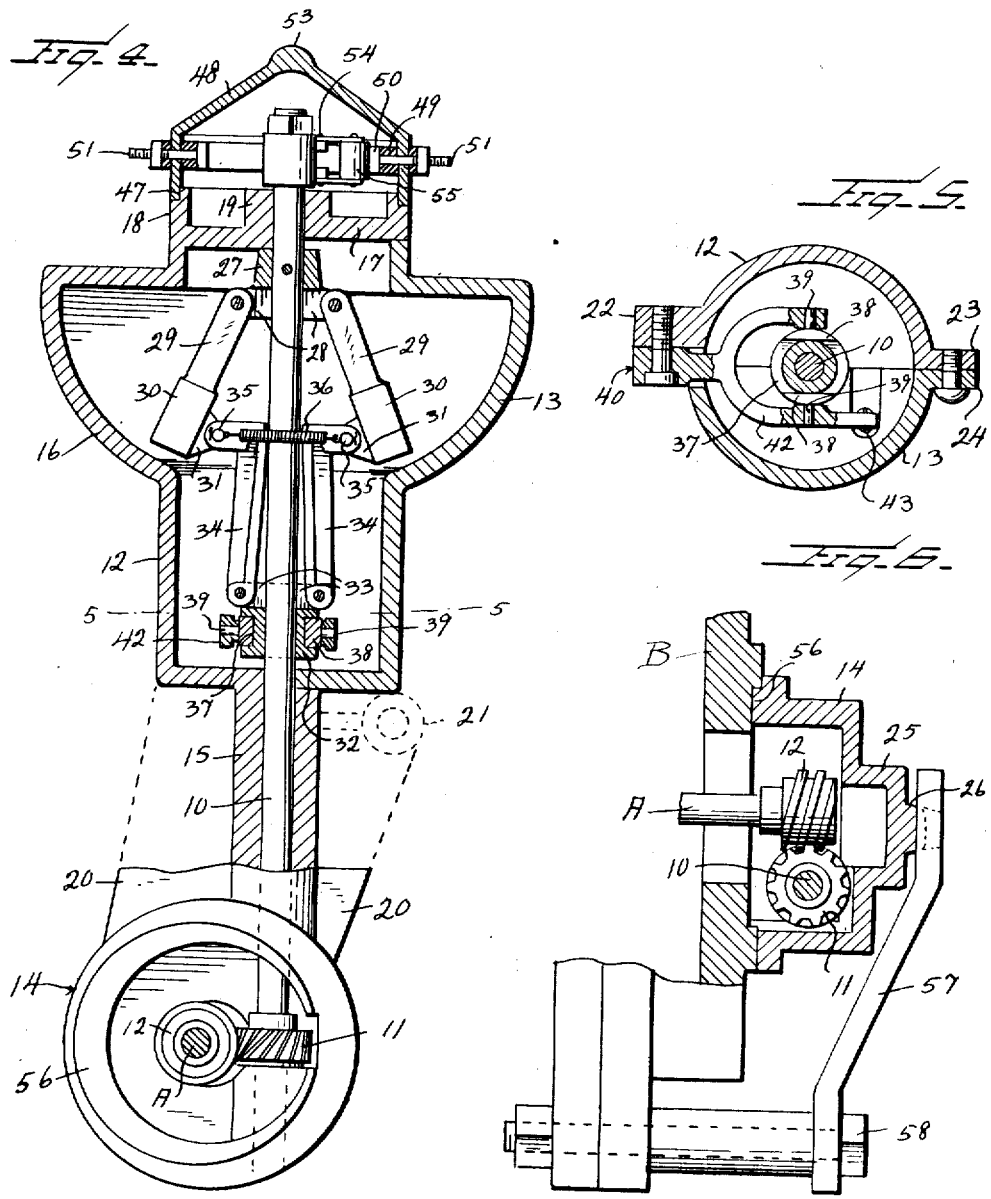

Patented July 31, 1923.

1,463,491

UNITED STATES PATENT OFFICE.

GENTRY L. TALLMAN AND ALVA A. JONES, OF SHELBYVILLE, ILLINOIS.

COMBINED GOVERNOR AND COMMUTATOR SUPPORT FOR MOTOR VEHICLES.

Application filed December 29, 1919. Serial No. 348,233.

*To all whom it may concern:*

Be it known that we, GENTRY L. TALLMAN and ALVA A. JONES, citizens of the United States, residing at Shelbyville, in the county of Shelby and State of Illinois, have invented certain new and useful Improvements in Combined Governor and Commutator Supports for Motor Vehicles, of which the following is a specification, reference being had to the accompanying drawings.

This invention relates to internal combustion engines, and particularly to the timing and governing mechanism thereof.

One of the objects of this invention is the provision of a very simple attachment, particularly adapted for tractors of the Fordson type, for Ford trucks and cars, and for other like makes of automobiles or tractors, this attachment being such that it may be readily applied to the vehicles above named and operatively connected with the usual timer shaft, and when so connected that it will control the operation of the engine by controlling the throttle valve thereof.

A further object is to provide an attachment of this character which may be used without the governing mechanism for the purpose of supporting the usual timer in a horizontal and relatively elevated position, and further so constructed that the usual timer such as is found on Fordson tractors and Ford cars and trucks may be applied upon the supporting means, or as a means for supporting a breaker and distributer to be used in connection with the ignition system, including starting and lighting systems.

A further object has to do with the details of construction and arrangement of parts as will be hereinafter more fully stated.

Our invention is illustrated in the accompanying drawings, wherein:—

Figure 1 is a side elevation of a portion of a tractor of the Fordson type showing our mechanism applied thereto;

Figure 2 is an elevation of a portion of the mixing chamber of the engine with the throttle lever applied thereto;

Figure 3 is a top plan view of the construction illustrated in Figure 2 but showing the connection of the throttle operating rod therewith;

Figure 4 is an enlarged vertical sectional view of the housing of our attachment, part of the housing being in elevation;

Figure 5 is a section on the line 5—5 of Figure 4;

Figure 6 is a sectional view of the engine housing and the lower end of the housing of our attachment, showing how the timer or commutator shaft of the attachment is connected to the commutator shaft of the engine;

Referring to these drawings, it will be seen that we have illustrated our device as applied to a Fordson tractor, and that A in the drawings designates what is ordinarily the timer shaft of the tractor, to which the timer arm with its make and brake roller is ordinarily connected, and over which the commutator case is disposed. Our attachment comprises a longitudinally extending shaft 10 which is supported for rotation as hereafter described, this shaft at its inner end being provided with a spiral gear 11 adapted to engage with a like spiral gear 12 mounted upon the extremity of the shaft A, this shaft A extending at right angles, of course, to the shaft 10 so that the shaft 10 extends vertically.

This shaft 10 is supported in a housing consisting of two sections 12 and 13. The section 12 comprises a circular, hollow base portion 14, a tubular portion 15, through which the shaft passes, and an approximately semi-circular shell 16, which is laterally enlarged to accommodate the governor. This portion 16 at its upper end is connected to an integral, transverse web 17 having an annular flange 18, and a central hub 19 forming a bearing for the shaft 10. The tubular portion of this section of the housing is formed with strengthening ribs 20, from one of which ribs extends the annular boss 21, through which the attaching screw or bolt for the attachment passes. At one point, the portion 16 of the housing is provided with an ear 22 for the pivotal support of a shifting lever, and at two other points the housing is provided with ears 23. The housing section 13 is also semi-circular in cross section and is formed to fit over the portion 16 of the other housing section, and is provided with ears 24 adapted to register with the ears 23 and through which bolts or screws for holding the two sections of the housing pass. The base section 14 of the housing is provided with a central, enlarged hub 25 with a central boss 26. The shaft 10 passes into the hollow, circular base portion 14 tangential to a circle, whose center is the boss 26.

The shaft 10 passes entirely through the housing, and mounted within the enlarged portion 16 of the housing is the governor mechanism, which comprises a collar 27 which is pinned or otherwise attached to the shaft, and is provided with bifurcated ears 28 in which the governor arms 29 are pivotally supported by transverse pins. These governor arms are weighted at their outer ends, as at 30, and these ends are provided with inwardly projecting ears 31. Mounted upon the shaft 10 is a sliding collar 32 also provided with laterally projecting, bifurcated ears 33, and pivoted to these ears are the links 34, which, at their upper ends, are outwardly angled and bifurcated to receive the lugs 31 to which they are pivoted by means of pins 35. A light coiled spring 36 is connected to these pins 35 so that this spring acts to urge the governor arms inward. Centrifugal force tends to urge the governor arms outward, and it will be obvious that as these governor arms are urged outward, they will shift the collar 32 upward on the shaft. The collar 32 is provided with a groove 37, and disposed in this groove and embracing the collar is a U-shaped segment 38 forming in effect a split ring which is provided with laterally projecting trunnions or gudgeons 39. Pivoted on the ear 22 is a lever 40, this lever having an outwardly projecting arm 41 and an inwardly projecting yoke 42, which in turn embraces the member 38 and is pivotally engaged with the gudgeons 39.

It will be obvious now that as the collar 32 is shifted by the action of the governor arms 29, the lever 40 will be shifted. The arm 41 of this lever 40 is connected to the throttle valve of the engine. A coiled spring 43 is connected to the extremity of the yoke 42 at one end and at its other end is connected to an adjusting screw 44 which extends down through a lug 45 extending out from the tubular portion 15 of the housing (see Figure 1) and on the opposite side of this lug this adjusting rod is engaged by a nut 46. By screwing up on this nut, the rod 44 will be retracted, thus increasing the tension of the spring 43, and by screwing back on the nut, this tension may be relaxed. Thus, the tension of this spring 43 may be increased and the resistance offered to the outward movement of the governor arms regulated.

The flange 18 is rabbeted upon its edge, as at 47. The commutator case 48 is of the usual form and its edge fits in the rabbeted edge of the flange 18. Disposed within the commutator case is the usual fiber ring 49 with the four metallic contacts 50 and the binding screws 51 extending radially therefrom. This commutator case is rotatable upon the flange 18, and to this end is provided with an outwardly projecting arm 52, to which a controlling rod may be connected. The apex of the case is formed with a central boss 53. Mounted upon the shaft is the usual commutator or timer arm 54 carrying the usual roller 55. The commutator arm and the commutator case may be such as are ordinarily found on Fordson tractors, Ford cars or the like, or a special form of commutator or circuit maker, breaker and distributer may be mounted upon this end of the housing. It is to be noted that the circular base has its edge face formed with a substantially annular rib 56 which fits into the wall B of the engine, which is so formed as to ordinarily support and fit against the commutator case. The base 14 of the housing is held against the rim B of the end wall by means of a clamp iron 57 which, at one end, is bolted to the housing of the engine, as at 58, and which, at its other end, is perforated to form a socket for the boss 26 on the body 25 of the housing. The commutator case 48 is held in place by means of an iron 59 which is also bolted to the casing or housing of the engine, and which is perforated at its opposite end to form a socket to receive the boss or protuberance 53 on the commutator casing.

The commutator casing is rotatably shifted by means of a rod 60 which pivotally connects with the arm 52 of the commutator casing and which, at its opposite end, is pivotally connected to an arm 61 projecting out from a shaft 62, and this shaft is mounted in suitable bearings in the casing of the engine, as is usual, and extends adjacent to the steering column and is connected to the spark advancing or retarding lever mounted on the dash board or steering column as usual. Inasmuch as this connection is well known and is the one commonly used in practically all makes of motor cars, it is not believed that it is necessary to illustrate the connection of the rod 62 to the controlling arm for the spark control. Obviously, when this shaft 62 is oscillated, the commutator casing will be oscillated and this will advance or retard the spark in the usual and well known manner. The arm 41 of the governor controlled lever 40 is connected by a connecting rod 63 to the upwardly projecting arm 64 of a bell crank lever, which is mounted upon a bracket 65 attached to the under side of the exhaust pipe C of the engine. The other arm 66 of this lever is connected to a vertically extending rod 67 which extends up behind the exhaust pipe, and at its upper end is mounted upon a throttle lever 68. This lever is mounted upon the stem 69 of the throttle valve 70 and is a two-arm lever, the rod 67 being connected to one of these arms.

Rotatably mounted in alignment with the stem 69 is a rock shaft 71 which is not connected to the stem 69 or directly to the lever 68, but is provided with an angular arm 72, the exeremity of which extends beneath the lever 68. This shaft 71 is mounted in a bracket 73 which is attached to the engine block. The lever 68 is provided at one end with an upwardly and inwardly extending stop lug 74, and the opposite end of the lever is bifurcated and formed with a stop screw 75 locked in place by a transverse screw 76. This stop lug 74 and the stop screw 75 engage against a stop 77 projecting from the choke pipe connection of the motor, which pipe connects the mixing chamber with the intake manifold D of the engine, this choke pipe being connected through the mixing chamber to a source of fuel. It will be obvious that the governor controls the throttle lever 68 independently of the action of rock shaft 71 and the arm 72. In other words, the throttle may be set at a particular position by means of the throttle controlling shaft 71, but it may be shifted to a still further closed position upon undue acceleration of the engine, which will cause the throttle valve to shift still further towards its closed position and thus throttle down the engine and as soon as the engine is throttled down, the throttle valve will return to its original position, which is the position limited by the position of the arm 72.

It will be seen that by the mechanism described, we provide in the first place a support for the commutator which supports the commutator in an elevated position for rotation in a horizontal plane as distinguished from a relatively depressed position with rotation in a vertical plane, and that this attachment may be so formed that by its use another and different form of commutator may be used in connection with a Ford truck, Ford car, or Fordson tractor than the usual commutator commonly sold and used with this make of car, and that thus any breaker and distributor may be used in connection with this form of car, and the breaker and distributer may be used with a battery ignition system and an electrical starting mechanism taking the current for ignition from the starting and lighting battery or generator when the motor is running. Of course, the housing constructed as described with the shaft 10 and its connections forms also a timer or commutator support for use with the common Ford commutator or either on a Fordson tractor, Ford car, or Ford truck. In both of the above cases, the governor need not be included, and in this case the housing would form merely an extension to raise the timer and dispose it in a horizontal position instead of a vertical position which raises the timer mechanism out of a position where it is liable to come in contact with dirt, grease, and other foreign matter and makes it accessible. By disposing within the housing the governor mechanism heretofore described, it is obvious that the car will be controlled by automatically controlling the throttle valve. Thus, we provide a combined commutator support and driving mechanism therefor with a governor controlling the action of the throttle valve and make these different parts in the form of an attachment which may be applied to the various forms of vehicles described.

While we have illustrated a particular form of our invention, and one which we have found to be thoroughly effective in actual practice, we do not wish to be limited thereto, as it is obvious that many changes might be made therein without departing from the spirit of the invention.

We claim:—

1. The combination with an internal combustion engine having a throttle valve and a horizontally disposed commutator shaft, of a vertical shaft operatively engaging the commutator shaft at its lower end and being driven therefrom, a commutator supported at the upper end of the vertical shaft and including a commutator arm mounted upon the vertical shaft, a collar mounted for rotation with the vertical shaft and having depending governor arms pivoted thereto, a sliding collar mounted on the shaft and having operative connection to the governor arms to be shifted thereby, means urging the governor arms inward against the action of centrifugal force, a lever operatively connected at one end to the sliding collar, a rod pivotally engaged with the other end of the lever, a bell crank lever mounted upon the engine, to one arm of which the rod is connected, a double arm lever operatively connected to the throttle valve, a rod connected to one arm of this double lever and at its other end operatively connected to the bell crank lever, a manually oscillatable rock shaft disposed in approximate alignment with the axis of the throttle valve and having an offset arm extending beneath one end of the throttle valve lever, and stops restricting the extent of oscillation of the throttle valve lever, one of said stops being adjustable.

2. The combination with an internal combustion engine having a throttle valve and a horizontally disposed commutator shaft, of a vertical shaft operatively engaging the commutator shaft at its lower end and being driven therefrom, a commutator supported at the upper end of the vertical shaft and including a commutator arm mounted upon the vertical shaft, an oscillatable casing having contacts, a collar mounted for rotation with the vertical shaft and adjacent its upper end having depending governor arms pivoted thereto, a sliding collar mounted on the shaft and having operative connection to the governor arms to be shifted thereby, means urging the governor arms inward against the action of centrifugal force, a lever operatively connected at one end to the sliding collar, a rod pivotally engaged with the other end of the lever, a bell crank lever mounted upon the engine, to one arm of which the rod is connected, a double arm lever operatively connected to the throttle valve, a rod connected to one arm of this double lever and at its other end operatively connected to the bell crank lever, a manually oscillatable rock shaft disposed in approximate alignment with the axis of the throttle valve and having an offset arm extending beneath one end of the throttle valve lever, and stops restricting the extent of oscillation of the throttle valve lever, one of said stops being adjustable, and a manually operable spark controlling rock shaft mounted upon the engine and operatively connected at one end of the commutator casing whereby the commutator casing may be oscillated.

3. The combination with a tractor having an internal combustion engine, and a throttle valve controlling fuel supply thereto, of an upright governor shaft driven from a running part of the engine, a centrifugal governor carried by said shaft, a lever subject to said governor, a spring acting directly upon one side of said lever, a casing enclosing the shaft and said governor, and an operating rod connected to said throttle valve and provided with a connection to said spring pressed lever whereby said throttle valve will be automatically operated from the governor.

4. The combination with a tractor having an internal combustion engine and a throttle valve controlling fuel supply thereto, of a governor casing secured to the front of the engine, an upright governor shaft working in said casing and provided with weighted levers rotatable therewith and working within said casing, means for driving said shaft from a running shaft of the engine, a spring pressed lever mounted on and having a lateral arm extending upwardly at one side of said casing arranged to be oscillated by said weighted levers under a rotation of said shaft, and a rod extending from said throttle valve and having a connection to said spring pressed lever whereby said throttle valve will be automatically controlled.

5. The combination with a tractor having an internal combustion engine and a throttle valve controlling the fuel supply thereto, of an upright governor shaft driven from a running part of the engine, a centrifugal governor carried by said shaft, a lever having an upwardly extending arm at one side of said shaft subject to said governor, a spring engaged with and resisting movement of the lever in one direction, a casing enclosing said shaft and spring, an operating rod connected to said throttle valve and provided with a connection to said spring pressed lever whereby said throttle valve will be automatically operated from said governor, and a current distributer having a cup-like casing detachably mounted on the upper end of said casing, said distributer casing supporting the relatively fixed contacts of the distributer and the upper end of said shaft carrying the movable element of said distributer.

6. The combination with a tractor having an internal combustion engine and a throttle valve controlling the fuel supply thereto, of an upright governor shaft driven from a running part of the engine, a centrifugal governor carried by said shaft, a spring pressed lever subject to said governor, a casing enclosing said shaft and said governor, an operating rod connected to said throttle valve and provided with a connection therefor to said spring pressed lever whereby said throttle valve will be automatically operated from said governor, and a current distributer having a cup-like casing detachably mounted on the upper end of said first named casing, said distributer casing supporting the relatively fixed contacts of the distributer and the upper end of said shaft carrying the movable element of said distributer, the said first named casing having a transverse web having a bearing, the upper face of the transverse web being annularly recessed.

In testimony whereof we hereunto affix our signatures.

GENTRY L. TALLMAN.
ALVA A. JONES.